United States Patent
Hofmann

(10) Patent No.: US 9,744,577 B2
(45) Date of Patent: Aug. 29, 2017

(54) ASYMMETRIC COIL SUPPORT

(71) Applicant: SMS LOGISTIKSYSTEME GMBH, Netphen (DE)

(72) Inventor: Karl Robert Hofmann, Netphen (DE)

(73) Assignee: SMS LOGISTIKSYSTEME GMBH, Netphen (DE)

( * ) Notice: Subject to any disclaimer, the term of this patent is extended or adjusted under 35 U.S.C. 154(b) by 0 days.

(21) Appl. No.: 14/650,494

(22) PCT Filed: Jan. 18, 2013

(86) PCT No.: PCT/EP2013/000153
§ 371 (c)(1),
(2) Date: Jun. 18, 2015

(87) PCT Pub. No.: WO2014/111100
PCT Pub. Date: Jul. 24, 2014

(65) Prior Publication Data
US 2015/0306650 A1  Oct. 29, 2015

(51) Int. Cl.
*B21C 47/24* (2006.01)
*B65G 25/02* (2006.01)

(52) U.S. Cl.
CPC .............. *B21C 47/24* (2013.01); *B65G 25/02* (2013.01); *B65G 2201/0232* (2013.01)

(58) Field of Classification Search
CPC ........................ B21C 47/24; B65G 2201/0232
See application file for complete search history.

(56) References Cited

U.S. PATENT DOCUMENTS

| | | | | |
|---|---|---|---|---|
| 4,934,511 A | | 6/1990 | Wood, III | |
| 4,971,508 A | * | 11/1990 | Miyahara et al. | ... B65G 1/0414 104/137 |
| 5,044,862 A | * | 9/1991 | Herigstad | ............ B65H 19/126 242/559 |
| 6,311,823 B1 | * | 11/2001 | Bierbaum | .............. B65G 47/34 198/360 |
| 6,364,093 B1 | | 4/2002 | LaBolt | |
| 6,640,936 B2 | * | 11/2003 | Ikeda | .................... B60T 11/046 188/106 F |
| 8,555,476 B2 | * | 10/2013 | Cramer | ................... B21C 47/24 242/363 |
| 2013/0256439 A1 | | 10/2013 | Cramer et al. | |

FOREIGN PATENT DOCUMENTS

WO     2013079081 A     6/2013

* cited by examiner

*Primary Examiner* — Sang Kim
(74) *Attorney, Agent, or Firm* — Andrew Wilford

(57) ABSTRACT

The invention relates to a device (1) in conveying equipment for moving metal strips wound to form coils (2), in particular produced from high-strength or ultra-high-strength steel grades, wherein for transport the coils (2) can be lifted and lowered from a resting position on a coil support (3) by means of a vertically adjustable coil lifting device (4), wherein the coil support (3) has two coil support elements (3a, 3b) which are laterally spaced apart from one another and the coil lifting device (4) has two support prongs (4a, 4b), characterized in that at least the coil support elements (3a, 3b) are disposed asymmetrically with respect to the vertical (5) through the center of rotation (2a) of the coil (2).

9 Claims, 4 Drawing Sheets

ASYMMETRIC COIL SUPPORT

CROSS REFERENCE TO RELATED APPLICATIONS

This application is the US-national stage of PCT application PCT/EP2013/000153 filed 18 Jan. 2013.

FIELD OF THE INVENTION

The invention relates to an apparatus in conveying equipment for moving a metal strip wound to form a coil, in particular produced from high-strength or ultra-high-strength steel grades, wherein for transport the coil can be lifted and lowered from a rest position on a coil support by a vertically adjustable coil lifter, the coil support has two coil support elements that are laterally spaced apart from one another, and the coil lifter has two support prongs.

STATE OF THE ART

In a modern rolling mill, different steel grades are processed that can be roughly divided into three basic groups. These are as follows:
1. Normal, generally hot-wound construction steels that are plastically deformed during winding. A free band flap, i.e. the exposed band end, practically lies against the coil from the outside, so that this band end must be peeled off the coil when it is to be introduced into a shear, for example.
2. High-strength fine-grain construction steels that are wound up in the medium temperature range and thermomechanically rolled. Because of the high strength of the steel, the sheets are only partially plastically deformed. A free band flap projects away from the coil slightly with a greater diameter, so that peeling it off is not required.
3. Ultra-high-strength steels that are quenched and tempered during the rolling process and possess extremely high strength. These materials, with related band thicknesses of maximally only approximately 15 mm, are no longer plastically deformed when they are wound up, but rather exclusively elastically stretched. A free band flap therefore assumes the fully stretched, straight form from the rolling line again when no forces act on it.

In the case of steel coils of the high-strength and ultra-high-strength types that are not strapped, the band end can lift the coil out of the supports, because the force exerted by the free band flap might suffice to lift the coil off at least one coil support element.

The known coil cradles or coil supports can counteract springing open, but only in the case of coils having a sufficiently great diameter, because they can lie on the coil cradle over a correspondingly greater partial circumference, all the way to a laterally outer region, in a corresponding large support base, so that springing open is counteracted because of the geometrically related longer lever arms of the inherent coil weight, from the center of the resting coil all the way to the lateral support region. This effect cannot be utilized, in contrast, in the case of coils having a smaller diameter that lie on the central region of the coil cradle only with a small partial diameter and in more concentrated manner, because of the resulting smaller support base.

In international application PCT/EP2011/006036 [WO 2013/079081] it has already been proposed in this regard to change the shape of the coil supports in such a manner that coils having different diameters can be laid on them, and springing open of the wound layers is supposed to be counteracted, without further measures, for every possible coil diameter. In practice, however, it has been shown that the coil supports described here do not yet completely achieve the desired effects in the case of coils composed of ultra-high-strength steel grades and having a small coil diameter.

OBJECT OF THE INVENTION

It was therefore an object of the invention to provide an apparatus in conveying equipment for moving metal strips wound to form coils that is able to overcome the disadvantages of the prior art, and is particularly suited for securely holding coils, even coils of ultra-high-strength steel grades having a small diameter, on the coil support in a rest position.

SUMMARY OF THE INVENTION

According to the invention, at least the coil support elements are positioned asymmetrically to a vertical plane through a center of rotation of the coil, thereby guaranteeing resting of the coil on the coil support, with the coil support elements at different spacings from the [vertical plane through the] center of the coil resting on them. As a result, it furthermore follows that one of the coil support elements is subjected to a greater load caused by displacement of the coil center of gravity toward a coil support element than in the case of symmetrical positioning, so that this greater load can press the band end more strongly against the coil. As a result, a thicker band or a more high-strength material or the two in combination can be supported or also transported, at the same coil diameter, than is the case with comparable, symmetrically configured coil supports.

In a preferred embodiment of the apparatus according to the invention, both the coil support elements and the support prongs are positioned asymmetrically to the vertical plane through the center of rotation of the coil. This ensures that the effects described above are achieved even when the coil is lifted off the coil lifter and lies exclusively on the support prongs of the coil-lifting carriage. The apparatus according to the invention can thereby carry ultra-high-strength steel grades having a small coil diameter securely and without lift-off when the coils are moved, because the free band end is pressed against the coil with a greater force than in the case of conventional coil-lifting carriages, even when lifted. Furthermore, this guarantees that when the coil is moved, the displacement of the vertical plane of the coil is restricted to a minimum or avoided entirely.

It is furthermore preferred if the support points for the coil on the coil support elements, preferably also the support points on the support prongs, are positioned at a vertical spacing from one another, in order to create the desired asymmetry.

It is likewise preferred if the support prongs have head faces that extend at a slant to one another, in order to thereby be able to have coils with different diameters lie on the coil cradle no longer only with a comparatively small support base, with close contact in the center or in planar manner proceeding from the center, toward both sides, but rather to have them lie on the support prongs that are at the same spacing from one another for every coil diameter. These then support both coils having a smaller diameter and coils having a greater diameter, always with the greatest possible support base, i.e. proceeding from the center axis of the coil cradle, toward both sides, to the maximally outermost location. Such a coil cradle is therefore very advantageous for coils or coils that are not strapped. In this connection, the spacing between the support prongs can be dimensioned merely so that, while a coil having the smallest diameter may sink down between the support prongs, it does not, however, come into engagement with any structure below and between the support prongs.

Position centering of the coil to be accommodated or lifted and moved, on the coil lifter, is achieved by head faces that extend at a slant relative to one another. Coil-lifting carriage apparatuses can be coil-lifting carriages, lifting beams or similar apparatuses, for example.

It is preferred if the coil support element that is spaced farther from a free band end is positioned in the apparatus to be vertically higher than the coil support element that is closer to a band end. Likewise, it is preferred if the support prong of the coil lifter that is spaced farther from the free band end is positioned in the apparatus to be vertically higher than the support prong that is closer to a band end. In this connection, the point of concern, in each instance, is the free band end on the outer surface of the coil or coil, as well as the support points for the coil or the coil on the coil support elements or on the support prongs. This orientation guarantees that the coil comes to lie asymmetrically within the apparatus according to the invention relative to the vertical plane through the center of rotation of the coil, and that the one support experiences a greater bearing stress than the other support.

In this connection, it is particularly preferred if a quotient of the vertical spacing between the coil support elements, relative to one another to the sum of the spacings between the vertical planes through the support points for the coil on the coil support elements and the vertical plane through the center of rotation of the coil is between 0.1 and 0.5. Likewise, it is preferred if a quotient of the vertical spacing between the support prongs to the sum of the spacings between the vertical plane through the support points for the coil on the support prongs and the vertical plane through the center of rotation of the coil is between 0.1 and 0.5. In this way, an apparatus is created that fulfills the purpose of coil stabilization for a particularly large number of different coil diameters and for all steel grades, even ultra-high-strength steel grades.

BRIEF DESCRIPTION OF THE DRAWING

FIG. 1 is a cross section through an apparatus according to the invention in a rest position, FIG. 2 is a cross section through an apparatus according to the invention of FIG. 1 in a moving position, FIG. 3 is a cross section through a part of the apparatus according to the invention in two different views, FIG. 4 is a cross section through a part of another apparatus according to the invention in two different views, and FIG. 5 shows the forces that act on the coil support elements and the support prongs while setting down and conveying a coil.

DETAILED DESCRIPTION OF THE INVENTION

Figure 1:
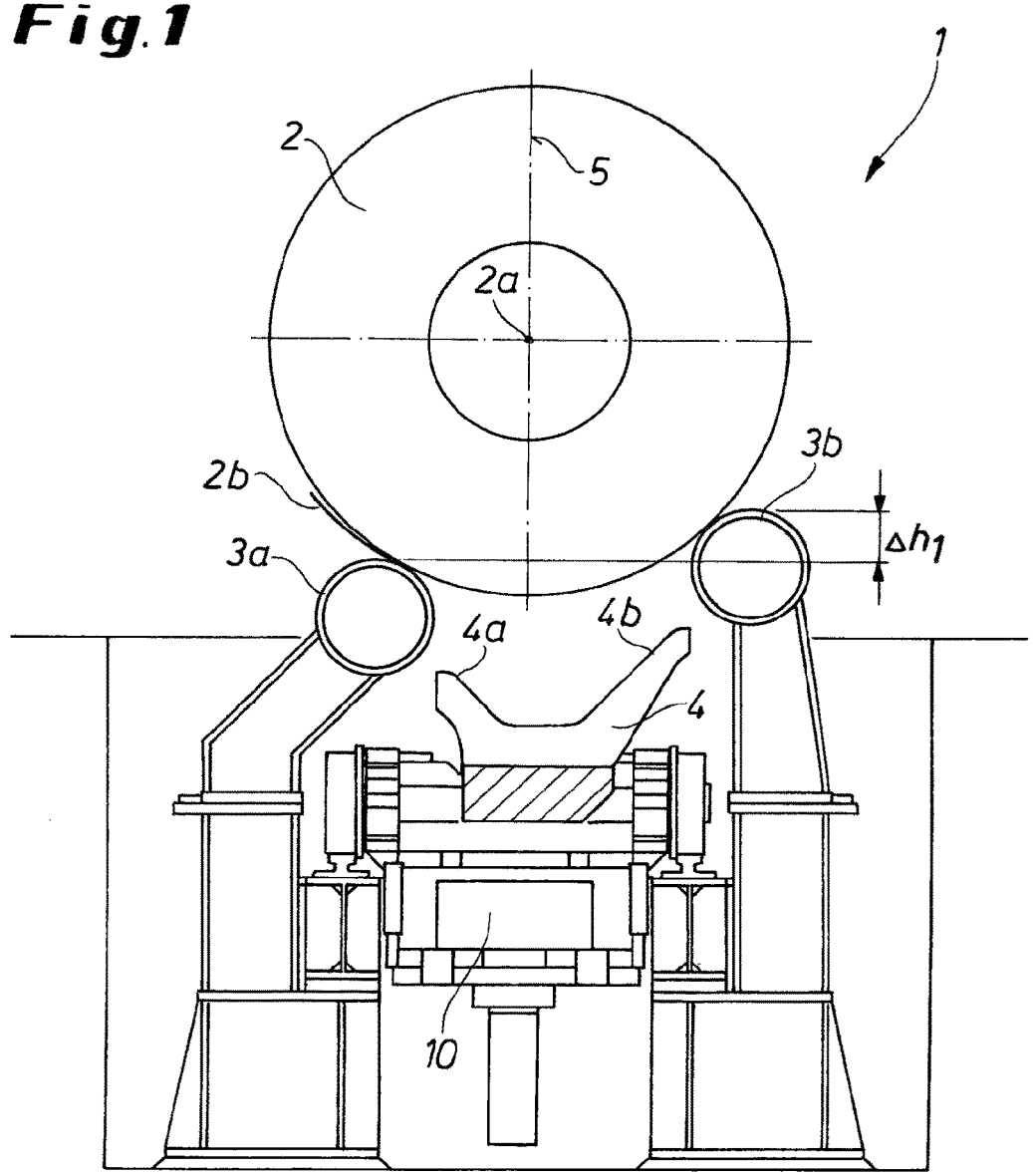
In FIGS. 1 to 5, the invention is described in greater detail by way of example, and preferred embodiments of the invention are shown in these figures that do not restrict the scope of protection of the invention as recorded in the appended claims.

FIG. 1 shows a view of an apparatus 1 according to the invention for moving a coil 2. In the rest position shown here, the coil 2 sits on two coil support elements 3a and 3b with the coil support element 3b facing away from the band end 2b vertically offset from the coil support element 3a facing the band end 2b by an amount $\Delta h_1$. As a result, the coil 2 rests on the coil support elements 3a and 3b in such a manner that the coil support elements 3a and 3b are positioned asymmetrically to a vertical plane 5 that passes through a center of rotation 2a of the coil 2. In the rest position shown here, a coil-lifting carriage 4 with two support prongs 4a and 4b and moveable upward and downward by a lifting cylinder 10 is lowered.

Figure 2:
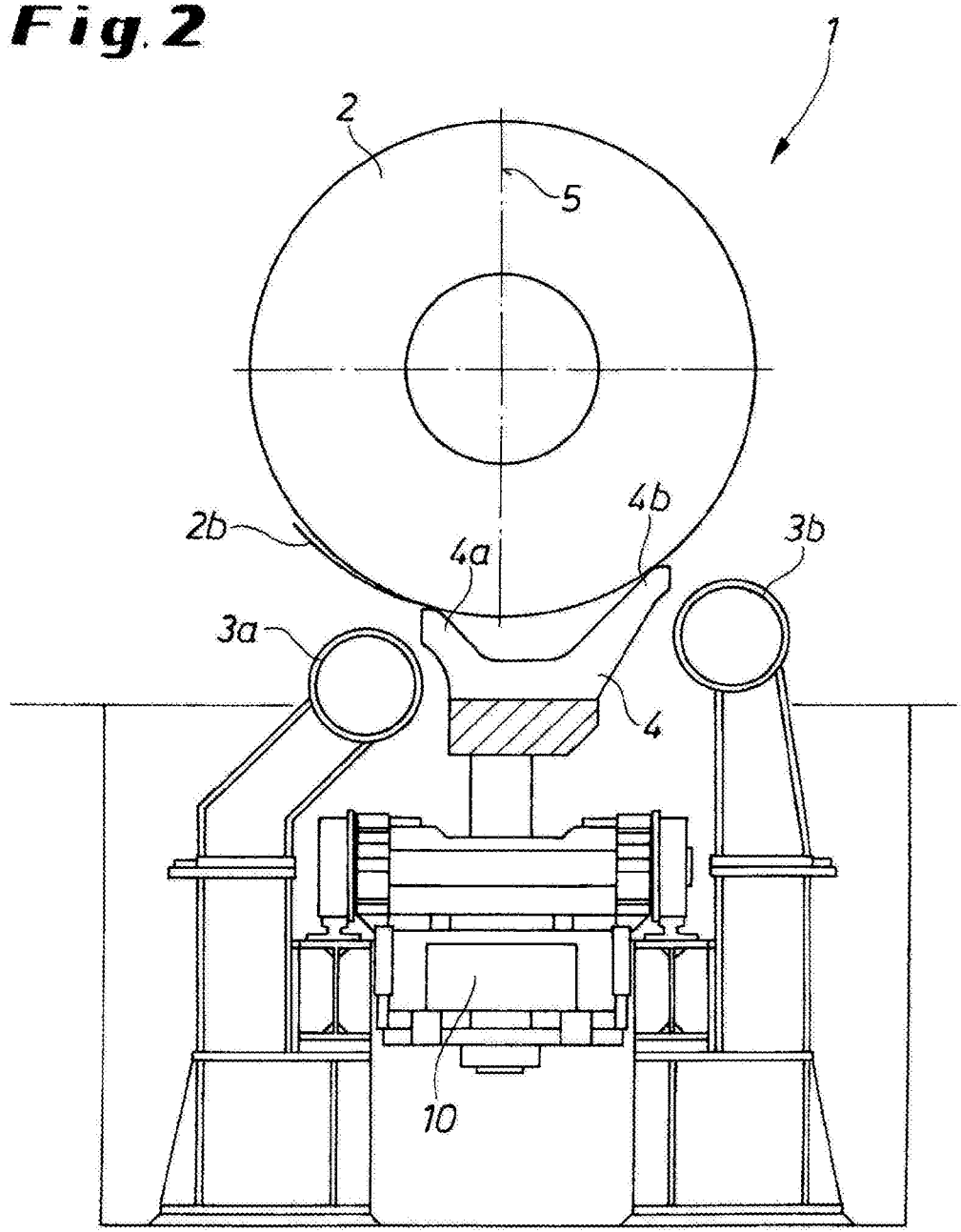

FIG. 2 shows the apparatus 1 in a moving position, in which the coil 2 no longer rests on the coil support elements 3a and 3b but rather on the support prongs 4a and 4b of the coil-lifting carriage 4 after activation of the lifting cylinder 10. Similar to the coil support elements 3a and 3b, the support prongs 4a and 4b are also positioned asymmetrically to the vertical plane 5 and vertically spaced apart from one another, in such a manner that the support prong 4a that faces a band end 2b is lower than the support prong 4b that is spaced farther from a band end 2b.

Figure 3:
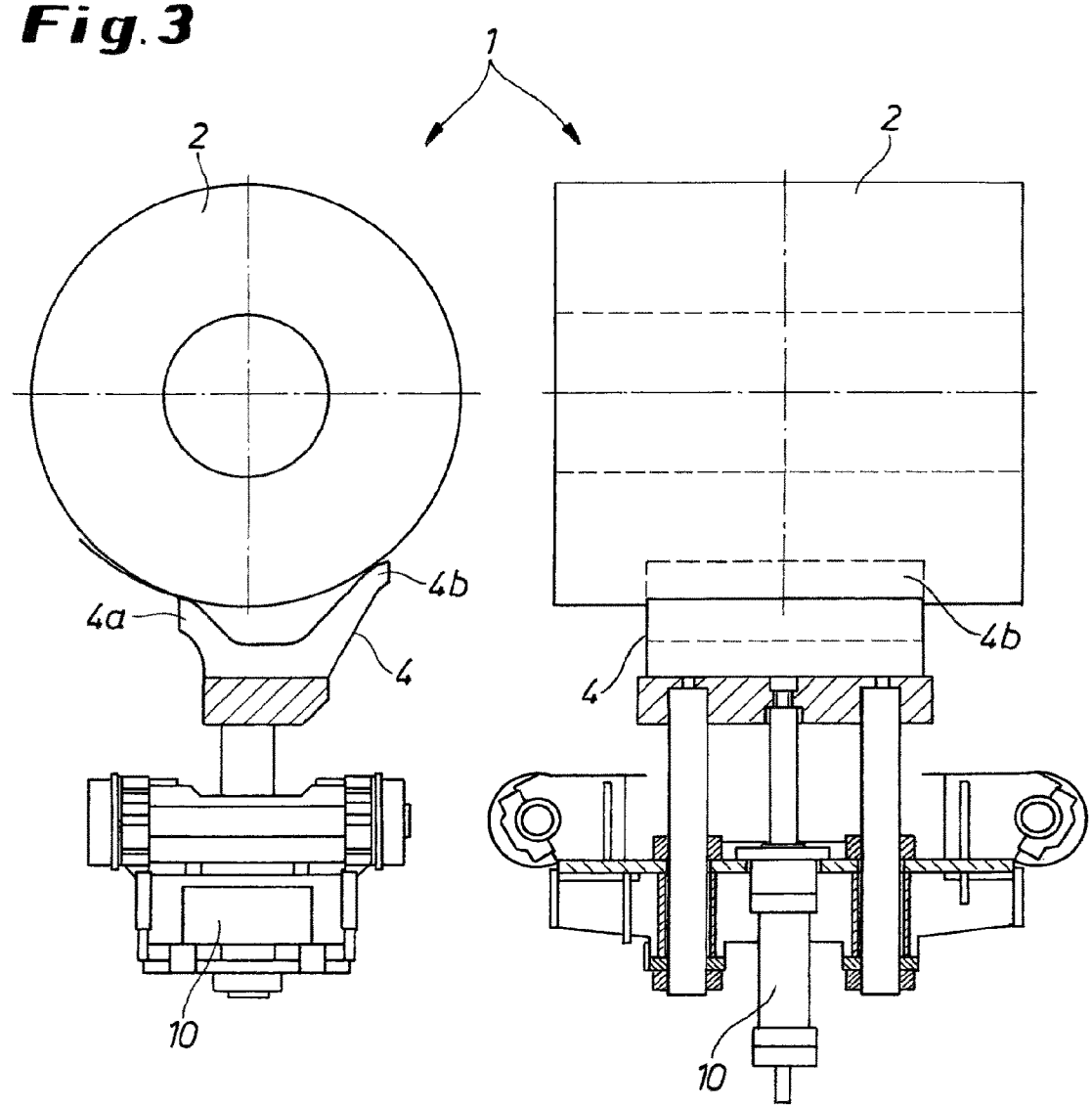

FIG. 3 shows the lifter 4 of the apparatus 1 according to FIGS. 1 and 2 in a view from the side and from the rear. The coil-lifting carriage 4 carries the coil 2 after activation of the lifting cylinder 10, and the view on the right in FIG. 3 shows that the coil-lifting carriage 4 has a longitudinal dimension such that the individual support prongs 4a and 4b do not extend along the entire width of the band that has been wound up into the coil 2. The lifter 10 for the coil-lifting carriage 4 consists of a central working cylinder as well as two guide cylinders laterally flanking the working cylinder 10 and ensuring that there will be no tilting of the coil-lifting carriage 4 when the coil 2 is moved.

Figure 4:
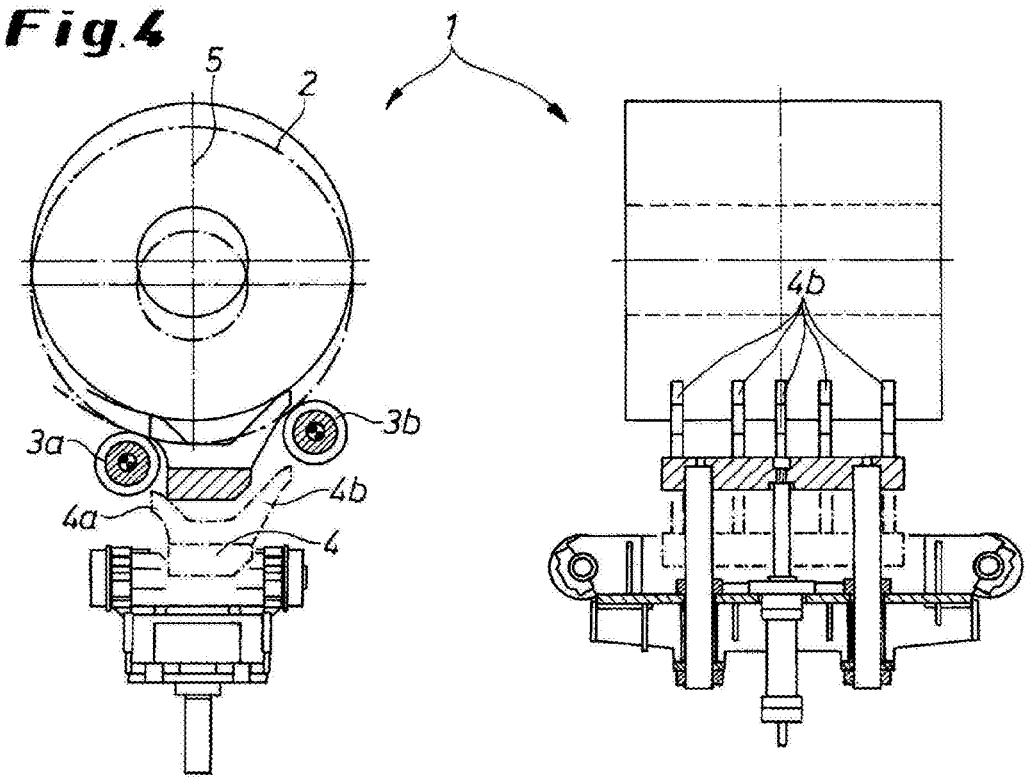

FIG. 4 shows two views of an apparatus 1 according to the invention in an alternative to the embodiment shown in FIG. 3 that differs from the form shown in FIG. 3 in that the width of the support prongs 4a and 4b is greater than the free space between the two coil supports 3a and 3b. The support prongs 4a and 4b of the coil support carriage 4 are therefore formed as combs in order to nevertheless permit a lifting movement of the coil-lifting carriage 4, in spite of the narrow free space between the coil support elements 3a and 3b. When the coil 2 is transferred from the coil support elements 3a and 3b to the support prongs 4a and 4b of the coil-lifting carriage 4, no lateral displacement of the vertical plane of the coil 2 therefore takes place, as shown on the left in FIG. 4.

Figure 5:
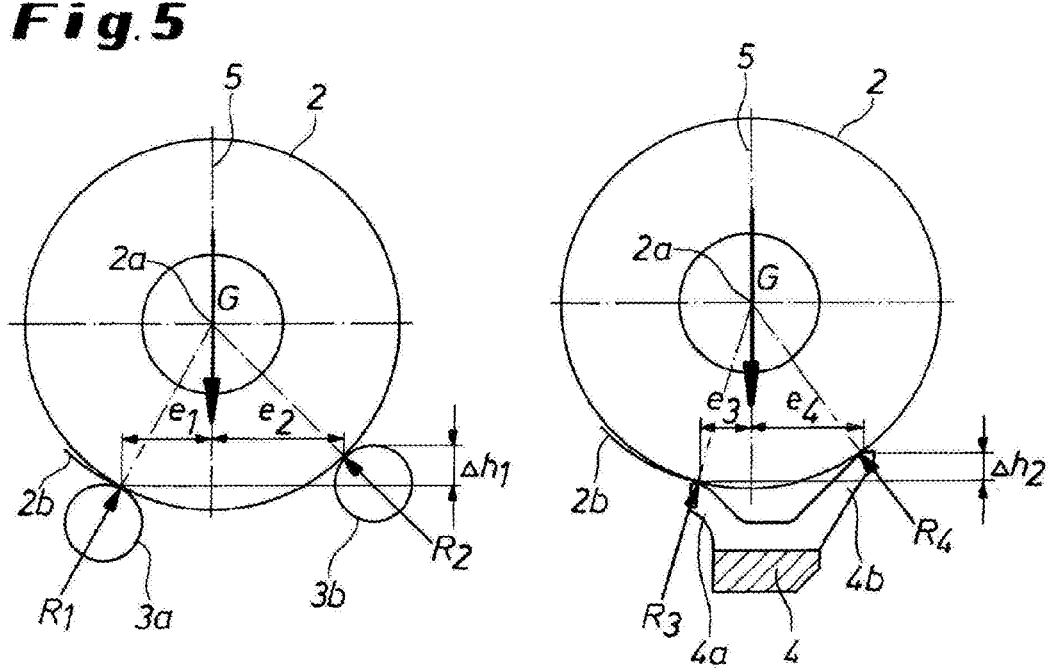

FIG. 5 shows the forces that act on the individual coil support elements 3a and 3b as well as on the support prongs 4a and 4b when the coil 2 is set down on the coil support elements 3a and 3b or on the support prongs 4a and 4b. The coil 2 lies on the coil support elements 3a and 3b with its gravitational weight G, and the spacing between the vertical plane 5 through the center of rotation 2a of the coil 2 and a vertical plane through the support point on the coil support element 3a that is closer to a coil end 2b, is indicated with $e_1$, and the spacing between the vertical plane 5 and a vertical plane through the support point of the coil 2 on the coil support element 3b is indicated with $e_2$. The vertical spacing between the two coil support elements 3a and 3b is equal to $\Delta h_1$. Because of this asymmetrical configuration of the arrangement of the coil support elements 3a and 3b, the gravitational weight that acts on the coil support element 3a is greater than the gravitational weight that acts on the coil support element 3b that is spaced farther from the band end 2b. Therefore the force $R_1$ applied by the coil support element 3a is greater than the force $R_2$ applied by the coil support element 3b. When the coil 2 is set down on the support prongs 4a and 4b of the coil support carriage 4, the spacing between the vertical plane 5 through the center of rotation 2a of the coil 2 and the vertical plane through the support point on the support prong 4a that is closer to the band end 2b is indicated as $e_3$, and the spacing between the vertical plane 5 and the vertical plane through the support point on the support prong 4b that is farther away from the band end 2b is indicated as $e_4$. The vertical spacing between the support points on the support prongs 4a and 4b is referred to as $\Delta h_2$. Because of this asymmetrical arrangement of the support prongs 4a and 4b to the vertical plane 5, the holding force $R_3$ applied by the support prong 4a is greater than the holding force $R_4$ applied by the support prong 4b. Accordingly, a greater force can be applied to the band end 2b at the same coil weights, as compared with conventional apparatuses for moving coils.

The invention claimed is:

1. An apparatus for supporting and transporting a coil of high-strength or ultra-high-strength metal strip centered on a horizontal axis and having a free strip end lying horizontally to one side of a vertical plane through the axis, the apparatus comprising:
a stationary support cradle having two horizontal support elements with upper support ends horizontally flanking the vertical plane and adapted to engage and support the coil, the upper support end to the one side of the vertical plane being lower than the upper support end to the other side of the vertical plane and horizontally closer to the vertical plane than the upper support end to the other side of the vertical plane; and
a vertically shiftable lifter generally between and below the support elements and having two horizontal support prongs with upper prong ends horizontally flanking the vertical plane and adapted to engage and support the coil, the upper prong end to the one side of the vertical plane being lower than the upper prong end to the other side of the vertical plane and horizontally closer to the vertical plane than the upper prong end to the other side of the vertical plane.

2. The apparatus according to claim 1, wherein the prong ends have head faces that extend at a slant relative to one another.

3. The apparatus according to claim 1, wherein the support ends have a horizontal spacing that is greater than a horizontal free space between the prong ends.

4. The apparatus according to claim 1, wherein the upper prong end on the other side is higher by a vertical spacing than the upper prong end on the one side.

5. The apparatus according to claim 4, wherein a quotient of the vertical spacing to a horizontal spacing between the upper prong ends is equal to between 0.1 and 0.5.

6. The apparatus according to claim 1, wherein a quotient of s vertical spacing between the upper support ends to a horizontal spacing between the upper support ends is equal to between 0.1 and 0.5.

7. The apparatus defined in claim 1, wherein the upper prong ends are at a fixed horizontal spacing from each other and the upper support ends are also at a fixed horizontal spacing from each other that is greater than the fixed horizontal spacing of the upper prong ends.

8. The apparatus defined in claim 1, wherein the upper support ends are stationary.

9. The apparatus defined in claim 1, wherein the upper prong ends are fixed to each other and move vertically jointly and synchronously.

* * * * *